US012522259B2

(12) United States Patent
Rusich et al.

(10) Patent No.: US 12,522,259 B2
(45) Date of Patent: Jan. 13, 2026

(54) HYPERLOOP ENVIRONMENTAL CONTROL SYSTEM

(71) Applicant: Hamilton Sundstrand Corporation, Charlotte, NC (US)

(72) Inventors: Richard Rusich, Ellington, CT (US); Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 217 days.

(21) Appl. No.: 18/181,009

(22) Filed: Mar. 9, 2023

(65) Prior Publication Data
US 2024/0300552 A1    Sep. 12, 2024

(51) Int. Cl.
F25B 9/00 (2006.01)
B61D 27/00 (2006.01)
F25B 9/06 (2006.01)

(52) U.S. Cl.
CPC .......... B61D 27/0018 (2013.01); F25B 9/004 (2013.01); F25B 9/06 (2013.01)

(58) Field of Classification Search
CPC ........ B64D 2013/0603; B64D 27/0018; B64D 2013/0688; B64D 2013/0614; F25B 9/004; F25B 9/06
See application file for complete search history.

(56) References Cited

U.S. PATENT DOCUMENTS

| 4,261,178 A * | 4/1981 | Cain ........................ B09B 3/00 62/149 |
| 4,445,342 A * | 5/1984 | Warner .................. B64D 13/06 236/13 |
| 5,918,472 A * | 7/1999 | Jonqueres .............. B64D 13/06 62/402 |
| 6,199,387 B1 | 3/2001 | Sauterleute |
| 6,250,097 B1 * | 6/2001 | Lui ........................ B64D 13/06 62/88 |
| 6,457,318 B1 | 10/2002 | Lui et al. |
| 6,595,010 B2 | 7/2003 | Sauterleute et al. |

(Continued)

FOREIGN PATENT DOCUMENTS

| CN | 107472274 A | 12/2017 |
| CN | 108583602 A | 9/2018 |

OTHER PUBLICATIONS

Extended European Search Report for European Application No. 24160325.7; Report Mail Date Jul. 19, 2024 (8 Pages).

Primary Examiner — David J Teitelbaum
(74) Attorney, Agent, or Firm — CANTOR COLBURN LLP

(57) ABSTRACT

An environmental control system for conditioning a cabin of a vehicle positioned in an enclosed air-evacuated environment includes a first inlet for receiving a flow of a first medium, a second inlet for receiving a flow of a second medium, and a thermodynamic device fluidly coupled to both the first inlet and the second inlet. The thermodynamic device includes a compressor and at least one turbine operably coupled by a shaft. At least one conduit is fluidly coupled to the second inlet and bypasses the thermodynamic device. A mixing point is fluidly coupled to an outlet of the at least one turbine to the at least one conduit. A recirculation heat exchanger is fluidly coupled to an outlet of the thermodynamic device and to the at least one conduit at a location upstream from the mixing point.

13 Claims, 1 Drawing Sheet

(56) References Cited

U.S. PATENT DOCUMENTS

| | | |
|---|---|---|
| 6,615,606 B2 | 9/2003 | Zywiak |
| 6,845,630 B2 | 1/2005 | Bruno et al. |
| 7,222,499 B2 | 5/2007 | Hunt |
| 8,418,495 B2 | 4/2013 | Merritt et al. |
| 9,487,300 B2 | 11/2016 | Klimpel et al. |
| 9,656,755 B2 | 5/2017 | Durbin et al. |
| 10,745,137 B2 | 8/2020 | Army et al. |
| 10,850,854 B2 | 12/2020 | Bruno |
| 10,940,951 B2 | 3/2021 | Bruno |
| 11,053,010 B2 | 7/2021 | Bruno et al. |
| 11,104,442 B2 | 8/2021 | Bruno |
| 11,136,050 B2 | 10/2021 | Frankenberger et al. |
| 11,174,031 B2 | 11/2021 | Ho et al. |
| 11,192,655 B2 | 12/2021 | Bruno et al. |
| 11,466,904 B2 | 10/2022 | Bruno |
| 2012/0291426 A1* | 11/2012 | Loison .................. B64D 41/00 60/412 |
| 2019/0225343 A1* | 7/2019 | Bruno .................. B64D 13/06 |
| 2020/0189620 A1* | 6/2020 | Bahman .................... B61B 1/02 |
| 2020/0391872 A1* | 12/2020 | Bruno .................. B64D 13/06 |
| 2021/0129629 A1 | 5/2021 | Frankenberger et al. |

\* cited by examiner

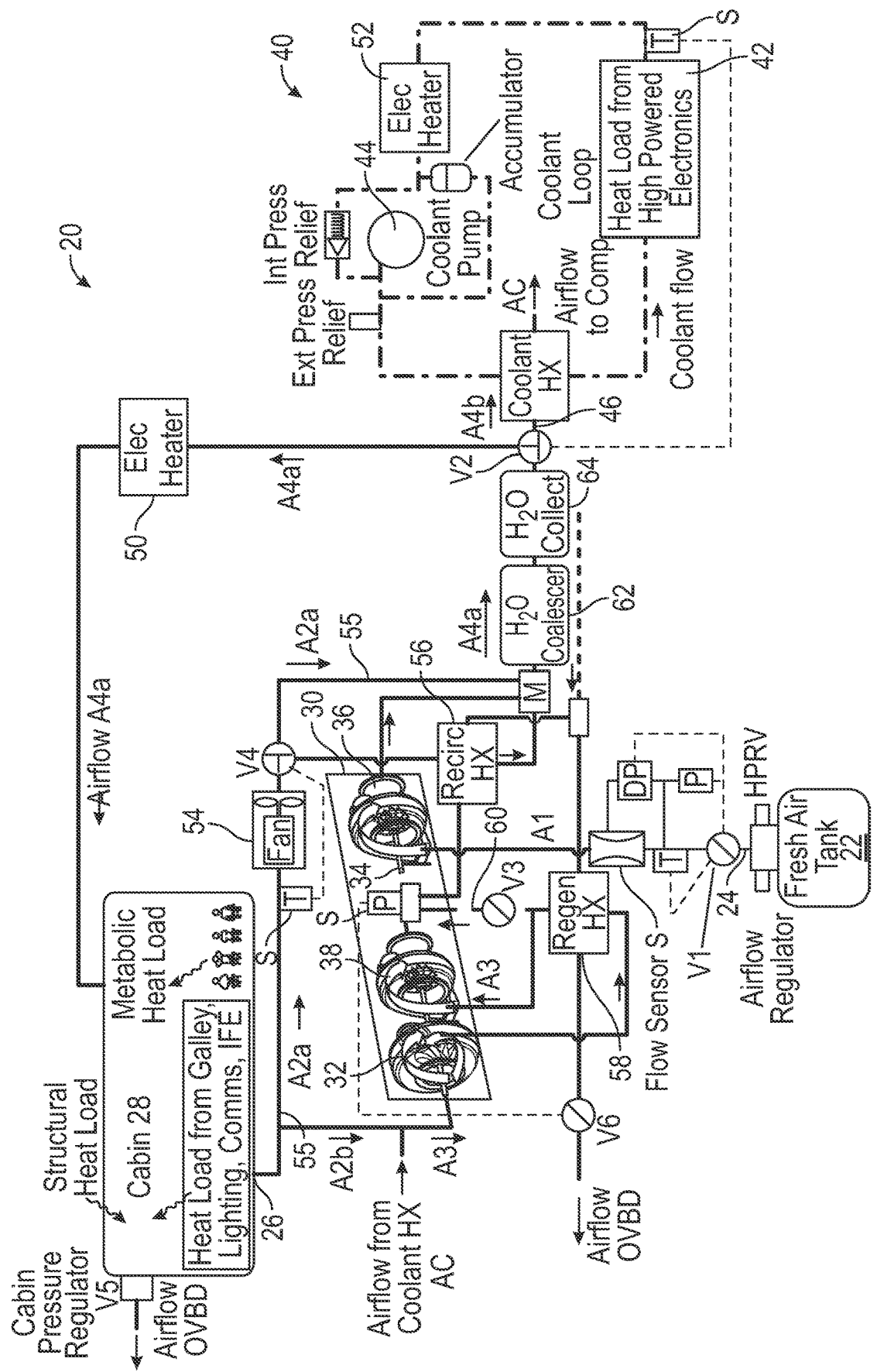

HYPERLOOP ENVIRONMENTAL CONTROL SYSTEM

BACKGROUND

The present disclosure relates to an environmental control system of a vehicle, and more particularly, to an environmental control system (ECS) for a vehicle travelling in a low pressure or zero pressure environment.

In general, a high-speed public transportation concept called the hyperloop has been proposed that can include a vehicle similar to a train car that travels inside of a tube. The air in the tube can be evacuated to a very deep vacuum, allowing the train to reach very high speeds without incurring the high-power demand that would otherwise be needed to overcome the high aerodynamic drag at normal atmospheric pressure. An air lock can permit passenger boarding and disembarking from the train station to the train without discharging the atmospheric air in the station into the vacuum in the tube.

As with similar transportation vehicles, environmental control of the occupied cabin is generally required to maintain adequate comfort and to provide heating, cooling and/or a continual supply of fresh air. Some typical methods used to provide air conditioning may not be conducive to this application. For example, many air conditioning systems exist which provide cool air to the cabin and on-board electronics may draw air from or ultimately exhaust the heat to the ambient atmosphere via convection heat transfer. When the ambient atmosphere is non-existent, as in space applications, heat can be rejected to deep space via radiation heat transfer. In the case of the hyperloop, there is little to no atmosphere in the tube, so rejecting heat into the tube via convection may not be practical while maintaining a reasonably sized heat exchanger to reject the heat. Moreover, heat rejection via radiation may also not be practical, since unlike radiating to space, which is near absolute zero degrees in temperature, the walls of the tube can be warmer than inside the cabin when the outside ambient temperature is warm. Moreover, while the train is moving at high speed, the amount of available electrical power consumption is limited since power is generally supplied solely by on-board batteries that have a limited quantity of electrical energy.

BRIEF DESCRIPTION

According to an embodiment, environmental control system for conditioning a cabin of a vehicle positioned in an enclosed air-evacuated environment includes a first inlet for receiving a flow of a first medium, a second inlet for receiving a flow of a second medium, and a thermodynamic device fluidly coupled to both the first inlet and the second inlet. The thermodynamic device includes a compressor and at least one turbine operably coupled by a shaft. At least one conduit is fluidly coupled to the second inlet and bypasses the thermodynamic device. A mixing point is fluidly coupled to an outlet of the at least one turbine to the at least one conduit. A recirculation heat exchanger is fluidly coupled to an outlet of the thermodynamic device and to the at least one conduit at a location upstream from the mixing point.

In addition to one or more of the features described herein, or as an alternative, in further embodiments the at least one turbine includes a first turbine and a second turbine operably coupled by the shaft.

In addition to one or more of the features described herein, or as an alternative, in further embodiments the at least one turbine is a dual entry turbine.

In addition to one or more of the features described herein, or as an alternative, in further embodiments a flow of medium from a cooling system is mixed with a portion of the flow of the second medium at a location upstream from an inlet of the thermodynamic device to form a third medium.

In addition to one or more of the features described herein, or as an alternative, in further embodiments the compressor and the at least one turbine are arranged in series relative to the flow of the third medium.

In addition to one or more of the features described herein, or as an alternative, in further embodiments including a regeneration heat exchanger fluidly coupled to both the compressor and the at least one turbine. The regeneration heat exchanger is positioned downstream from the compressor and upstream from the at least one turbine relative to the flow of the third medium.

In addition to one or more of the features described herein, or as an alternative, in further embodiments the regeneration heat exchanger is fluidly coupled to an outlet of the recirculation heat exchanger such that the flow of the third medium provided at an outlet of the compressor is cooled within the regeneration heat exchanger by the flow of the third medium provided from an outlet of the recirculation heat exchanger.

In addition to one or more of the features described herein, or as an alternative, in further embodiments including a circulation fan operably coupled to the at least one conduit fluidly coupled to the second inlet. The circulation fan is configured to pump a portion of the second medium through the at least one conduit to the mixing point and to move air within the cabin.

In addition to one or more of the features described herein, or as an alternative, in further embodiments the at least one conduit fluidly coupled to the second inlet and to the mixing point includes a bypass conduit fluidly coupled to the mixing point and configured to bypass the recirculation heat exchanger.

In addition to one or more of the features described herein, or as an alternative, in further embodiments including at least one vessel of a pressurized first medium located on-board the vehicle.

In addition to one or more of the features described herein, or as an alternative, in further embodiments the vehicle is a train.

According to an embodiment, a method of operating an environmental control system to condition a cabin of a vehicle positioned in an enclosed, air-evacuated tube includes extracting energy from a first medium at at least one turbine of a thermodynamic device to form an expanded first medium, pumping a first portion of a second medium to bypass the thermodynamic device, mixing a second portion of the second medium with a flow of medium output from a cooling system to form a third medium, providing the third medium to the thermodynamic device, cooling the first portion of the second medium using the third medium output from thermodynamic device at a recirculation heat exchanger, and mixing the expanded first medium and the first portion of the second medium at a mixing point to form a conditioned medium.

In addition to one or more of the features described herein, or as an alternative, in further embodiments providing the third medium to the thermodynamic device includes compressing the third medium at a compressor of the thermodynamic device to form a compressed third medium, providing the compressed third medium to the at least one turbine of the thermodynamic device, and extracting energy from the third medium within the at least one turbine to form an expanded third medium.

In addition to one or more of the features described herein, or as an alternative, in further embodiments cooling the compressed third medium using the third medium output from the recirculation heat exchanger. The regeneration heat exchanger is arranged upstream from the at least one turbine.

In addition to one or more of the features described herein, or as an alternative, in further embodiments exhausting the third medium output from the regeneration heat exchanger into the enclosed, air-evacuated tube.

In addition to one or more of the features described herein, or as an alternative, in further embodiments the at least one turbine includes a first turbine and a second turbine, the extracting energy from the first medium occurring at the first turbine and the extracting energy from the third medium occurring at the second turbine.

In addition to one or more of the features described herein, or as an alternative, in further embodiments operating a valve to direct the first portion of the second medium into a bypass conduit. The bypass conduit bypasses the recirculation heat exchanger.

In addition to one or more of the features described herein, or as an alternative, in further embodiments removing moisture from the conditioned medium.

In addition to one or more of the features described herein, or as an alternative, in further embodiments providing a first portion of the conditioned medium to the cabin and providing a second portion of the conditioned medium to the cooling system.

In addition to one or more of the features described herein, or as an alternative, in further embodiments providing the second portion of the conditioned medium to the cooling system further comprises removing heat from the cooling system.

BRIEF DESCRIPTION OF THE DRAWINGS

The following descriptions should not be considered limiting in any way. With reference to the accompanying drawings, like elements are numbered alike:

The FIGURE is a schematic diagram of an example environmental control system (ECS) for a vehicle travelling within a hyperloop tube according to an embodiment.

DETAILED DESCRIPTION

A detailed description of one or more embodiments of the disclosed apparatus and method are presented herein by way of exemplification and not limitation with reference to the Figures.

The example embodiments disclosed herein are illustrative of a hyperloop environmental control system, and assemblies of the present disclosure and methods/techniques thereof. It should be understood, however, that the disclosed embodiments are merely examples of the present disclosure, which may be embodied in various forms. Therefore, details disclosed herein with reference to example hyperloop environmental control systems and associated processes/techniques of fabrication/assembly and use are not to be interpreted as limiting, but merely as the basis for teaching one skilled in the art how to make and use the systems/assemblies and/or alternative systems/assemblies of the present disclosure.

With reference now to the FIGURE, an example of an environmental control system 20 suitable for use with a vehicle movable within an enclosed air-evacuated environment is illustrated. The air-evacuated environment has a substantially zero-pressure or is a vacuum. In an embodiment, the vehicle is a car or train movable through a tube of a hyperloop system. As shown, the environmental control system 20 includes one or more vessels 22 located on-board the vehicle and configured to store a pressurized medium therein, such as high-pressure air for example. In an embodiment, the pressure of the medium within the at least one vessel 22 is between about 2000 psi about 3000 psi. The one or more vessels 22 may be considered a first fluid source and are fluidly coupled to a first inlet 24 of the environmental control system 20 to deliver a controlled flow of a first medium A1 to the environmental control system 20. The one or more vessels 22 may be filled, refilled, or replaced when the vehicle is stopped at a station or other facility.

The environmental control system 20 may additionally receive a second medium A2 at a second inlet 26. In one embodiment, the second inlet 26 is operably coupled to a volume 28, such as the cabin or chamber of the vehicle in which the people are typically located. In such embodiments, the second medium A2 is cabin recirculation air. The environmental control system 20 is operable to provide a conditioned flow of one or both of the first medium A1 and the second medium A2 to the cabin 28 at standard atmospheric pressure of about 14.7 psi.

The environmental control system 20 may include at least one thermodynamic device 30, and in some embodiments, may include a plurality of thermodynamic devices. A thermodynamic device 30, as described herein, is a mechanical device that includes one or more components for performing thermodynamic work on a medium (e.g., extracts work from or applies work to the first medium A1 or the second medium A2 by raising and/or lowering pressure and by raising and/or lowering temperature). Examples of a thermodynamic device 30 include an air cycle machine, a two-wheel air cycle machine, a three-wheel air cycle machine, a four-wheel air cycle machine etc.

The single thermodynamic device 30 shown in the FIGURE. includes a compressor 32 and at least one turbine operably coupled by a shaft 34. In the illustrated, non-limiting embodiment, the thermodynamic device includes 30 a first turbine 36 and a second turbine 38. Although the first turbine 36 and the second turbine 38 are illustrated and described herein as two distinct turbines separately mounted to the shaft 34, it should be appreciated that a single turbine having two distinct inlets and nozzles for receiving two separate fluid flows may alternatively be used. For example, a single turbine, sometimes referred to as a dual entry turbine may have a first nozzle and inlet associated with the operations described herein relative the first turbine 36 and a second nozzle and inlet associated with the operations described herein relative to the second turbine 38. However, embodiments where the thermodynamic device 30 includes a single turbine, or alternatively, more than two turbines are also within the scope of the disclosure.

A compressor, such as compressor 32 for example, is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as first turbine 36 or second turbine 38 for example, is a mechanical device that expands a medium and extracts work therefrom (also referred to as extracting energy) to drive the compressor 32 via the shaft 34. The turbines 36, 38 may include a nozzle (not shown) configured to accelerate the medium supplied thereto for entry into an impeller of the turbine.

In addition to providing a conditioned medium to the cabin 28, the environmental control system 20 may be used to transfer or redistribute heat between various systems onboard the vehicle. In an embodiment, the environmental control system 20 is operably coupled to a cooling system 40 used to cool high-powered electronics 42 located onboard the vehicle. As shown, a coolant, such as propylene glycol or ethylene glycol for example, is configured to circulate through the electronics 42 via a coolant pump 44, then is then provided to an electronics heat exchanger 46. In the illustrated, non-limiting embodiment, the environmental control system 20 is operably coupled to the cooling system 40 via the electronics heat exchanger 46. Accordingly, at the electronics heat exchanger 46, during operation of the environmental control system 20 in a "cooling mode" where the air provided to the cabin 28 is intended to reduce the temperature therein, heat is transferred from the coolant to the relatively cool medium of the environmental control system 20. Heat may also be transferred from the coolant to the relatively cool medium of the environmental control system 20 during operation in a "heating mode" where the air provided to the cabin is intended to increase the temperature therein.

The elements of the environmental control system 20 are connected via valves, tubes, pipes, conduits and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the environmental control system 20 can be regulated to a desired value. For instance, a first valve V1, such as an airflow regulator for example, is configured to control the flow of the first medium A1 provided to the environmental control system 20 via the first inlet 24. A second valve V2 may be operable to control the flow of a conditioned medium to both the cabin 28 and to the cooling system 40 and a third valve V3 may be operable to allow a portion of a medium to bypass a portion of the thermodynamic device 30, such as the second turbine 38 for example. A fourth valve may be operable to selectively allow a portion of the second medium to bypass a heat exchanger in which the second medium is typically cooled. The environmental control system 20 may additionally include one or more valves V5, V6 operable to exhaust a flow of medium from the cabin 28 or the environmental control system 20 overboard from the vehicle, such as into the atmosphere surrounding the exterior of the vehicle.

One or more of the valves V1-V6 may be configured to receive commands from an ECS controller (not shown), such as in response to feedback provided from one or more sensors S located in specific/desired locations in the environmental control system 20. Although various pressure and temperature sensors are illustrated, it should be appreciated that other sensors operable to monitor any suitable parameter of the environmental control system 20 and/or the cooling system 40 are within the scope of the disclosure.

Furthermore, a heater 50, such as an electrical heater for example, may also be provided for instances where the conditioned medium to be delivered to the cabin 28 needs to be heated. In such embodiments, the heater 50 may be arranged directly upstream from the cabin 28 relative to a flow of the conditioned medium. Alternatively, or in addition, a heater 52, such as an electrical heater, may be provided in the cooling system 40 for instances where the medium to be delivered to the cabin 28 needs additional heat beyond the load exhausted by the electronics 42.

In operation, a flow of first medium A1 at the first inlet 24, controlled by valve V1, is provided to an inlet of a turbine of the thermodynamic device 30, such as the first turbine 36 for example. Within the first turbine 36, the first medium A1 is expanded and work or energy is extracted therefrom to form an expanded first medium A1. As a result, the expanded first medium A1 provided at the outlet of first turbine 36 is cooler and/or has a lower pressure than the first medium A1 provided to the inlet of the first turbine 36. At the same time, the second medium A2 is provided to the second inlet 26 of the environmental control system 20, such as from the cabin 28. As shown, in some embodiments, the flow of the second medium A2 may split into a first portion A2$a$ and a second portion A2$b$.

Operation of a circulation fan 54 associated with the cabin 28 is configured not only to move the air within the cabin 28, but also to pump the first portion A2$a$ of the second medium through at least one conduit 55 fluidly coupled to the second inlet 26 toward a mixing point located downstream from the outlet of the first turbine 36. The first portion A2$a$ of the second medium is configured to bypass the thermodynamic device 30.

When the valve V4 is in a first position, at least a portion of the flow of the first portion A2$a$ of the second medium pumped by the circulation fan 54 is provided to a first inlet of a recirculation heat exchanger 56. The first portion A2$a$ of the second medium is typically cooled within the recirculation heat exchanger 56 before being mixed with the expanded first medium A1 output from the turbine 36 at the mixing point. When the valve V4 is arranged in a second position, at least some of the flow of the first portion A2$a$ of the second medium pumped by the circulation fan 54 is directed into a bypass conduit 55 in which the flow is configured to bypass the recirculation heat exchanger 56. The first portion A2$a$ of the second medium output from the bypass conduit 55 is mixed with the expanded first medium A1 at the same mixing point or at a different mixing point from where the expanded first medium A1 is mixed with the first portion A2$a$ of the second medium output from the recirculation heat exchanger 56. In an embodiment, the outlet of the first turbine 36, the bypass conduit 55, and the first outlet of the recirculation heat exchanger 56 are each fluidly coupled to a mixing unit or duct M in which the flows are mixed to form a conditioned medium A4.

The second portion A2$b$ of the second medium is mixed with a flow of medium Ac returned from the cooling system 40, such as output from the electronics heat exchanger 46 for example, at a location upstream from the thermodynamic device 30 to form a mixed third medium A3. The third medium A3 is provided to the thermodynamic device 30. In an embodiment, the third medium A3 is provided to an inlet of the compressor 32. The work extracted from the first medium A1 in the first turbine 36 is used to drive the compressor 32 to compress the third medium A3. The act of compressing the third medium A3 heats the third medium A3 and increases the pressure thereof to form a compressed third medium A3. In some embodiments, a regeneration heat exchanger 58 is arranged downstream from the outlet of the compressor 32 and upstream from an inlet of a turbine of the thermodynamic device 30. Within the regeneration heat exchanger 58, the compressed third medium A3 may be cooled.

The first outlet of the regeneration heat exchanger 58 may be fluidly coupled to an inlet of the second turbine 38.

Accordingly, in some embodiments, the third medium A3 is configured to flow through the compressor 32 and the turbine 38 of the thermodynamic device 30 in series. Within the second turbine 38, the compressed third medium A3 is expanded, and work is extracted therefrom to form an expanded third medium A3. The work extracted from the compressed third medium A3 in the second turbine 38 is used alone or in combination with the work extracted at the first turbine 36 to drive the compressor 32 to compress the third medium A3. Accordingly, the expanded third medium A3 provided at the outlet of second turbine 38 is cooler and/or has a lower pressure than the compressed third medium A3 provided to the inlet of the second turbine 38.

It should be appreciated that in some embodiments, valve V3 may be positioned such that at least a portion of the flow of the third medium A3 output from the first outlet of the regeneration heat exchanger 58 is directed to a bypass conduit 60 and is therefore configured to bypass the second turbine 38. In such embodiments, the flow output from the bypass conduit 60 is configured to mix with the expanded flow output from the second turbine 38 at or directly downstream from the outlet of the second turbine 38. Accordingly, the term "expanded third medium" may refer to the compressed third medium A3 from the bypass conduit, the expanded third medium output from the second turbine 38, or some mixture thereof.

The expanded third medium A3 at or directly downstream from the outlet from the second turbine 38 may ultimately be exhausted overboard, such as into the air-evacuated or vacuum environment surrounding the vehicle. However, in an embodiment, the expanded third medium A3 may be used as a heat sink within the environmental control system before being exhausted overboard. As shown, the expanded third medium A3 directly downstream from the outlet from the second turbine 38 may be provided to a second inlet of the recirculation heat exchanger 56. Within the recirculation heat exchanger 56, the cool expanded third medium A3 acts as a heat sink to absorb heat from the first portion A2a of the second medium. Alternatively, or in addition, the expanded third medium A3 at or directly downstream from the outlet from the second turbine 38 may be used as a heat sink at the regeneration heat exchanger 58. In the illustrated, non-limiting embodiment, the recirculation heat exchanger 56 and the regeneration heat exchanger 58 are arranged in series relative to the flow of the third medium A3. Accordingly, the warm flow of the expanded third medium A3 output from a second outlet of the recirculation heat exchanger 56 may be provided directly to a second inlet of the regeneration heat exchanger 58. Within the regeneration heat exchanger 58, heat transfers from the hot flow of third medium A3 output from the compressor 32 to the warm third medium A3 provided from the recirculation heat exchanger 56.

As noted above, the conditioned medium A4 is formed from a combination of the expanded first medium A1 output from the turbine 36 and the first portion A2a of the second medium (output from the recirculation heat exchanger 56 and/or the bypass conduit 55). The mixing of the expanded first medium A1 and the first portion A2a of the second medium to form the condition medium A4 occurs upstream from valve V2, and in some embodiments, may occur upstream from a water separator 62 and/or a water collector 64 operable to dry the conditioned medium. As the conditioned medium A4 passes through the water separator 62 and water collector 64, any liquid present within the conditioned medium A4, is removed.

From the water collector 64, all or at least a portion of the dried conditioned medium A4 is provided to the cabin 28 to condition the cabin 28. Depending on the operating conditions of the environmental control system 20, in some embodiments, the dried conditioned medium A4 output from the water collector 64 may be separated into a first flow of conditioned medium A4a used to condition the cabin 28 and a second flow of conditioned medium A4b for use by the cooling system 40. The amount of conditioned medium A4 provided to the cabin 28 and the cooling system 40, respectively, is controlled by the position of the valve V2. In an embodiment, the volume, or the rate at which the first flow of conditioned medium A4a is provided to the cabin 28 is equal to the volume or rate at which air is exhausted from the cabin 28 overboard, such as via operation of the cabin pressure regulator V5. As a result, the pressure within the cabin 28 remains generally constant.

As previously described, the second flow of conditioned medium A4b may be provided to an electronics heat exchanger 46 of the cooling system 40. Within the electronics heat exchanger 46, the second flow of conditioned medium A4b typically acts as a heat sink to absorb heat from the coolant. The resulting heated medium output from the electronics heat exchanger 46, represented as flow Ac, is then returned to the environmental control system 20 where it is mixed with the second portion A2b of the second medium, for example at a location upstream from the thermodynamic device 30.

An environmental control system 20 as illustrated and described here provides an efficient system for conditioning a cabin 28 of a vehicle travelling within low pressure environment or a vacuum.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system for conditioning a cabin of a vehicle positioned in an enclosed air-evacuated environment, the environmental control system comprising:

a first inlet for receiving a flow of a first source of a medium;

a second inlet for receiving a flow of a second source of the medium;

a thermodynamic device fluidly coupled to both the first inlet and the second inlet, the thermodynamic device including a compressor and at least one turbine operably coupled by a shaft;

a recirculation heat exchanger fluidly coupled to an outlet of the thermodynamic device;

at least one conduit fluidly coupled to the second inlet, the at least one conduit bypassing the thermodynamic device and the recirculation heat exchanger;

a mixing point fluidly coupled to an outlet of the at least one turbine and fluidly coupled to the at least one conduit; and a recirculation heat exchanger fluidly coupled to an outlet of the thermodynamic device and to the at least one conduit upstream from the mixing point another conduit fluidly coupled to an inlet of the recirculation heat exchanger, the another conduit being fluidly coupled to the at least one conduit upstream from the mixing point; and a valve movable to direct at least a portion of the flow of the second source of the medium from the at least one conduit to the another conduit.

2. The environmental control system of claim 1, wherein the at least one turbine further comprises a first turbine and a second turbine operably coupled by the shaft.

3. The environmental control system of claim 1, wherein the at least one turbine is a dual entry turbine.

4. The environmental control system of claim 1, wherein a flow of the medium from a cooling system is mixed with a portion of the flow of the second source of the medium at a location upstream from an inlet of the thermodynamic device to form a third source of the medium.

5. The environmental control system of claim 4, wherein the compressor and the at least one turbine are arranged in series relative to the flow of the third source of the medium.

6. The environmental control system of claim 4, further comprising a regeneration heat exchanger fluidly coupled to both the compressor and the at least one turbine, the regeneration heat exchanger being positioned downstream from the compressor and upstream from the at least one turbine relative to the flow of the third source of the medium.

7. The environmental control system of claim 6, wherein the regeneration heat exchanger is fluidly coupled to an outlet of the recirculation heat exchanger such that the flow of the third source of the medium provided at an outlet of the compressor is cooled within the regeneration heat exchanger by the flow of the third source of the medium provided from an outlet of the recirculation heat exchanger.

8. The environmental control system of claim 1, further comprising a circulation fan operably coupled to the at least one conduit fluidly coupled to the second inlet, the circulation fan being configured to pump a portion of the second source of the medium through the at least one conduit to the mixing point and to move air within the cabin.

9. The environmental control system of claim 1, wherein the at least one conduit fluidly coupled to the second inlet and to the mixing point further comprises a bypass conduit fluidly coupled to the mixing point and configured to bypass the recirculation heat exchanger.

10. The environmental control system of claim 1, further comprising at least one vessel of a pressurized of the first source of the medium located on board the vehicle.

11. The environmental control system of claim 1, wherein the vehicle is a train.

12. An environmental control system for conditioning a cabin of a vehicle positioned in an enclosed air-evacuated environment, the environmental control system comprising:

a first inlet for receiving a flow of a first source of a medium;

a second inlet for receiving a flow of a second source of a medium;

a thermodynamic device fluidly coupled to both the first inlet and the second inlet, the thermodynamic device including a compressor and at least one turbine operably coupled by a shaft;

at least one conduit fluidly coupled to the second inlet, the at least one conduit bypassing the thermodynamic device;

a mixing point fluidly coupled to an outlet of the at least one turbine and fluidly coupled to the at least one conduit;

a recirculation heat exchanger fluidly coupled to an outlet of the thermodynamic device and to the at least one conduit upstream from the mixing point; and wherein the at least one conduit fluidly coupled to the second inlet and to the mixing point further comprises a bypass conduit fluidly coupled to the mixing point and configured to bypass the recirculation heat exchanger.

13. An environmental control system for conditioning a cabin of a vehicle positioned in an enclosed air-evacuated environment, the environmental control system comprising:

a first inlet for receiving a flow of a first source of a medium;

a second inlet for receiving a flow of a second source of the medium;

a thermodynamic device fluidly coupled to both the first inlet and the second inlet, the thermodynamic device including a compressor and at least one turbine operably coupled by a shaft;

at least one conduit fluidly coupled to the second inlet, the at least one conduit bypassing the thermodynamic device;

a mixing point fluidly coupled to an outlet of the at least one turbine and fluidly coupled to the at least one conduit;

a recirculation heat exchanger fluidly coupled to an outlet of the thermodynamic device and to the at least one conduit upstream from the mixing point; and a circulation fan operably coupled to the at least one conduit fluidly coupled to the second inlet, the circulation fan being configured to pump a portion of the second source of the medium through the at least one conduit to the mixing point and to move air within the cabin.

* * * * *